United States Patent
Lindberg et al.

(10) Patent No.: US 8,478,348 B2
(45) Date of Patent: Jul. 2, 2013

(54) DEFERRING ALERTS

(75) Inventors: Phillip John Lindberg, Helsinki (FI);
Sami Johannes Niemelä, Helsinki (FI)

(73) Assignee: Nokia Corporation, Espoo (FI)

( * ) Notice: Subject to any disclaimer, the term of this patent is extended or adjusted under 35 U.S.C. 154(b) by 354 days.

(21) Appl. No.: 12/670,047

(22) PCT Filed: Nov. 14, 2007

(86) PCT No.: PCT/EP2007/062335
§ 371 (c)(1),
(2), (4) Date: Mar. 12, 2010

(87) PCT Pub. No.: WO2009/012820
PCT Pub. Date: Jan. 29, 2009

(65) Prior Publication Data
US 2010/0184484 A1    Jul. 22, 2010

(51) Int. Cl.
*H04B 1/38*    (2006.01)
(52) U.S. Cl.
USPC .......................................................... 455/566
(58) Field of Classification Search
USPC ................. 455/415, 566, 414.1, 414.2, 42.1,
455/432.3, 550.1, 567, 414.3; 345/123, 339,
345/168, 173; 368/251, 248, 224, 243, 10,
368/109, 244, 247, 250, 262, 263, 267, 119;
340/815.4; 715/764
See application file for complete search history.

(56) References Cited

U.S. PATENT DOCUMENTS

| | | | |
|---|---|---|---|
| 6,477,117 B1 | 11/2002 | Narayanaswami et al. | 368/251 |
| 6,717,520 B1 * | 4/2004 | Dorenbosch | 340/636.1 |
| 6,757,714 B1 * | 6/2004 | Hansen | 709/206 |
| 8,126,979 B2 * | 2/2012 | Abbott et al. | 709/206 |
| 2005/0289476 A1 | 12/2005 | Tokkonen | 715/769 |
| 2006/0025112 A1 * | 2/2006 | Hamanaga et al. | 455/412.1 |
| 2006/0148531 A1 * | 7/2006 | Iwata et al. | 455/566 |
| 2007/0146347 A1 * | 6/2007 | Rosenberg | 345/173 |
| 2009/0191850 A1 * | 7/2009 | Cardwell et al. | 455/412.2 |

FOREIGN PATENT DOCUMENTS

EP    1 589 385 A2    10/2005

* cited by examiner

*Primary Examiner* — Melody Mehrpour
(74) *Attorney, Agent, or Firm* — Harrington & Smith

(57) ABSTRACT

It is presented a method including presenting an alert on a display; detecting a user input associated with said alert, said user input having a momentum; and deferring said alert to be presented again at a new alert time, said new alert time being calculated as a time in the future using said user input momentum. A corresponding device, computer program product and user interface are also presented.

21 Claims, 6 Drawing Sheets

DEFERRING ALERTS

FIELD OF THE INVENTION

The present invention generally relates to alert presentation and more particularly to deferring alerts.

BACKGROUND OF THE INVENTION

Many software applications in the prior art display alerts to the user. For example, messaging applications display message alerts, calendar applications display meeting reminders and clock applications can display alarm alerts. This type of alerting is used in electronic devices of all sizes, including mobile communication terminals, personal digital assistants (PDAs) as well as personal computers.

Often the user is allowed to acknowledge the alert, whereby the alert is deleted, or to delay the alert such that it reappears at a time in the future.

While the user interfaces to handle alerts of the prior art allow the user to perform most functions, the user interfaces are awkward and inefficient to use.

Consequently, there is a need for an improved user interface to manage alerts.

SUMMARY

In view of the above, an objective of the invention is to solve or at least reduce the problems discussed above.

Generally, the above objectives are achieved by the attached independent patent claims.

According to a first aspect of the present invention there has been provided a method comprising: presenting an alert on a display; detecting a user input associated with the alert, the user input having a momentum; and deferring the alert to be presented again at a new alert time, the new alert time being calculated as a time in the future using the user input momentum. This allows for a intuitive and efficient way for the user to defer alerts.

The presenting an alert may involve presenting a graphical representation of the alert on the display; and the detecting a user input may involve detecting a direction of the user input and moving the graphical representation on the display in accordance with the direction and momentum of the user input.

The method may further comprise after the detecting a user input: presenting an animation on the display, the animation indicating a movement of the alert in time from a present time to the new alert in time.

The method may further comprise after the detecting a user input: presenting the new alert in time on the display or using speech synthesis.

The detecting may involve detecting a direction of the user input and the deferring could optionally only occur if the direction, with a margin of error, is associated with deferring the alert.

When the direction, within a margin of error, is associated with deleting the alert, the alert may be deleted.

When the direction, within a margin of error, is associated with saving the alert, the alert may be saved.

When the direction, within a margin of error, is associated with coupling the alert to a place, the alert may be coupled to a place.

The detecting a user input may involve determining the momentum by calculating an average speed of the user input.

The detecting a user input may involve determining the momentum by calculating an average speed of an end portion of the user input.

The detecting a user input may involve detecting an orbital motion associated with said alert.

The display may be a touch-sensitive display and the detecting a user input may involve detecting a depression in a position corresponding to the alert; detecting a movement on the touch-sensitive display and detecting a lift from the touch-sensitive display.

The alert may be an alert selected from the group consisting of a message alert, an alarm, a calendar reminder and an alert for low battery.

The method may be performed in a mobile communication apparatus.

A second aspect of the present invention is an apparatus comprising: a display; and a controller, wherein the controller is arranged to present an alert on a display; the controller is further arranged to detect a user input associated with the alert, the user input having a momentum; and the controller is further arranged to, as a result of detecting the user input, defer the alert to be presented again at a new alert in time, the new alert time being calculated as a time in the future using the user input momentum.

The apparatus may be comprised in a mobile communication apparatus.

The display may be a touch-sensitive display, and the controller may be configured to detect the user input using the touch-sensitive display.

A third aspect of the present invention is an apparatus comprising: means for presenting an alert on a display; means for detecting a user input associated with the alert, the user input having a momentum; and means for deferring the alert to be presented again at a new alert time, the new alert time being calculated as a time in the future using the user input momentum.

The apparatus may be comprised in a mobile communication apparatus.

A fourth aspect of the present invention is a computer program product comprising software instructions that, when executed in a controller of a mobile communication apparatus, performs the method according to the first aspect.

A fifth aspect is a user interface comprising: a display; wherein the user interface is arranged to present an alert on a display; the user interface is further arranged to detect a user input associated with the alert, the user input having a momentum; and the user interface is further arranged to, as a result of detecting the user input, defer the alert to be presented again at a new alert in time, the new alert time being calculated as a time in the future using the user input momentum.

Any feature of the first aspect may be applied to the second, third, fourth and/or fifth aspect.

Other objectives, features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments of the present invention will now be described in more detail, reference being made to the enclosed drawings, in which.

DETAILED DESCRIPTION OF EMBODIMENTS

The present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
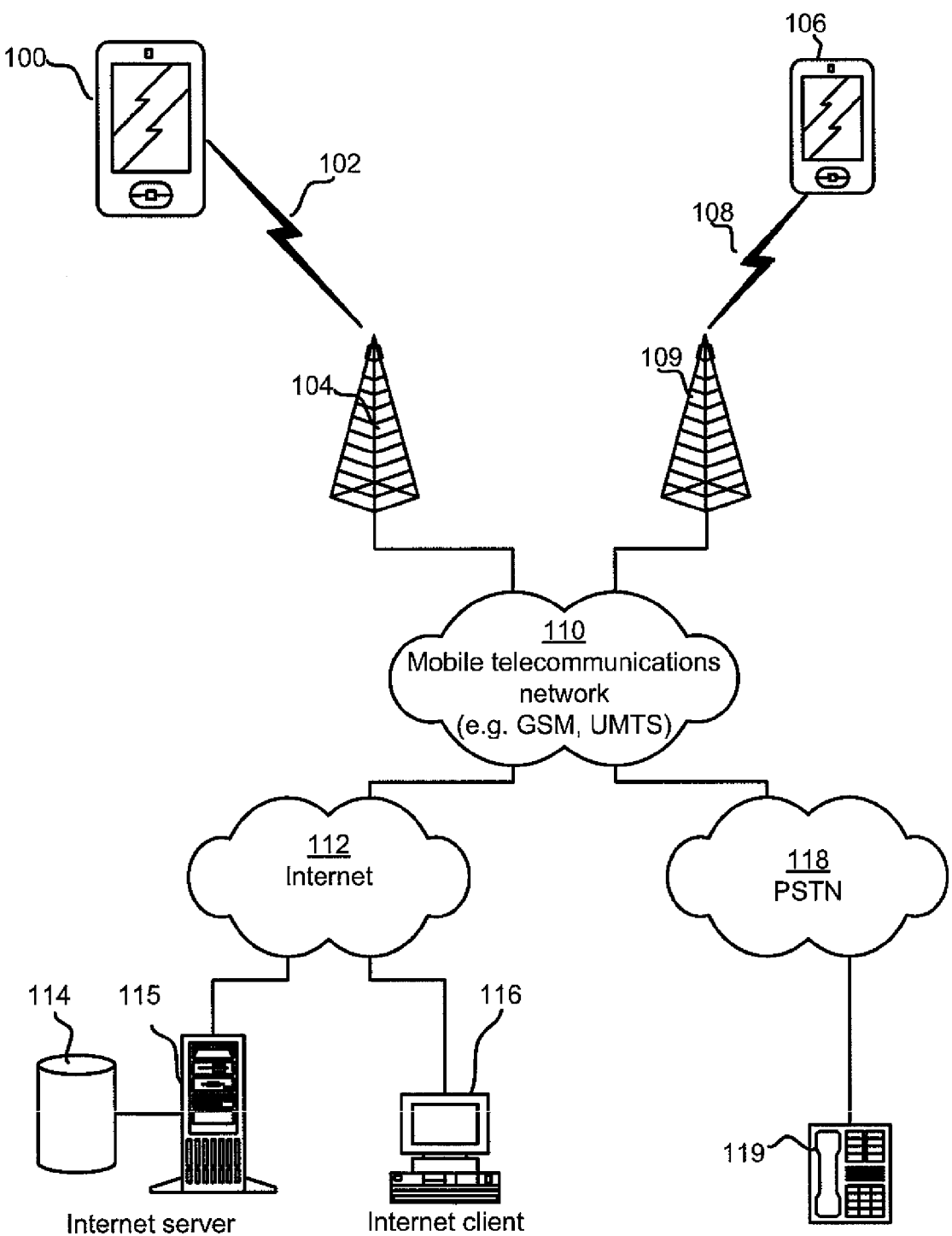
FIG. 1 is a schematic illustration of a cellular telecommunication system, as an example of an environment in which the present invention may be applied.

FIG. 1 illustrates an example of a cellular telecommunications system in which the invention may be applied. In the telecommunication system of FIG. 1, various telecommunications services such as cellular voice calls, www/wap browsing, cellular video calls, data calls, facsimile transmissions, music transmissions, still image transmissions, video transmissions, electronic message transmissions and electronic commerce may be performed between a mobile terminal 100 according to the present invention and other devices, such as another mobile terminal 106 or a stationary telephone 119. It is to be noted that for different embodiments of the mobile terminal 100 and in different situations, different ones of the telecommunications services referred to above may or may not be available; the invention is not limited to any particular set of services in this respect.

The mobile terminals 100, 106 are connected to a mobile telecommunications network 110 through RF links 102, 108 via base stations 104, 109. The mobile telecommunications network 110 may be in compliance with any commercially available mobile telecommunications standard, such as GSM, UMTS, D-AMPS, CDMA2000, FOMA and TD-SCDMA.

The mobile telecommunications network 110 is operatively connected to a wide area network 112, which may be Internet or a part thereof. A server 115 has a data storage 114 and is connected to the wide area network 112, as is an Internet client computer 116.

A public switched telephone network (PSTN) 118 is connected to the mobile telecommunications network 110 in a familiar manner. Various telephone terminals, including the stationary telephone 119, are connected to the PSTN 118.

Figure 2:
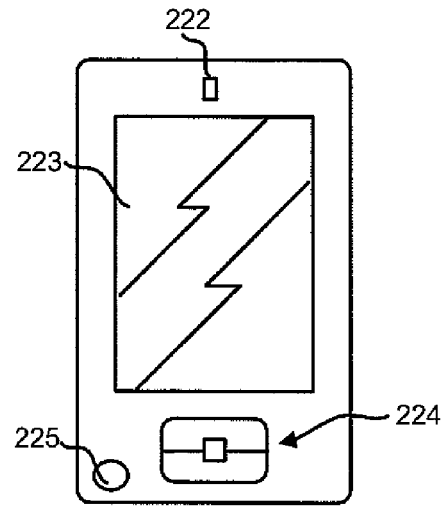
FIG. 2 is a schematic front view illustrating a mobile terminal according to an embodiment of the present invention.

An embodiment 200 of the mobile terminal 100 is illustrated in more detail in FIG. 2. The mobile terminal 200 comprises a speaker or earphone 222, a microphone 225, a touch-sensitive display 223 and a set of keys 224.

Figure 3:
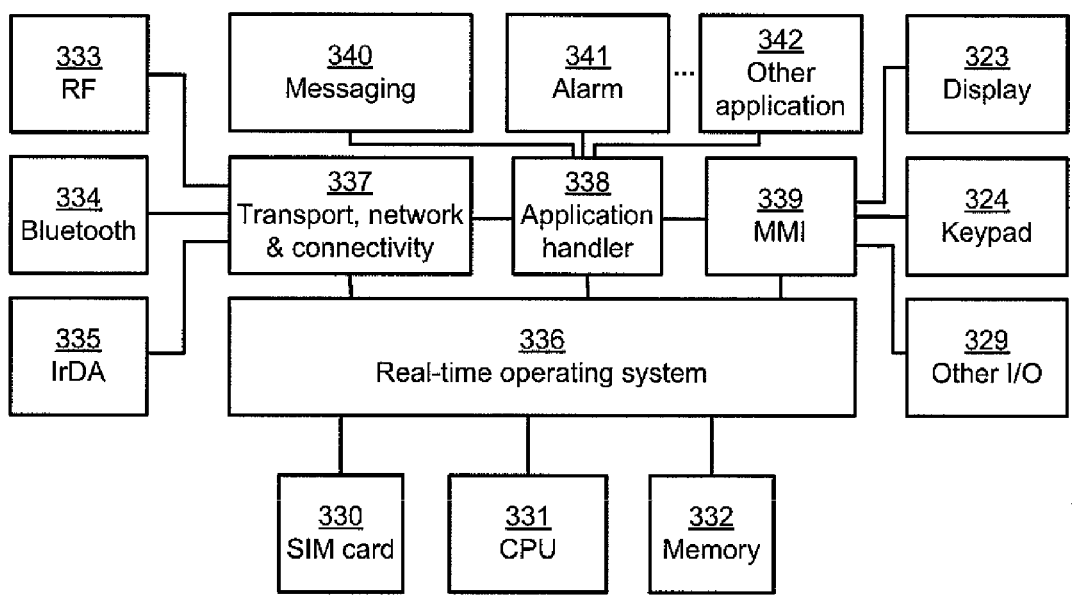
FIG. 3 is a schematic block diagram representing an internal component, software and protocol structure of the mobile terminal shown in FIG. 2.

The internal component, software and protocol structure of the mobile terminal 200 will now be described with reference to FIG. 3. The mobile terminal has a controller 331 which is responsible for the overall operation of the mobile terminal and is preferably implemented by any commercially available CPU ("Central Processing Unit"), DSP ("Digital Signal Processor") or any other electronic programmable logic device. The controller 331 has associated electronic memory 332 such as RAM memory, ROM memory, EEPROM memory, flash memory, hard drive, optical storage or any combination thereof. The memory 332 is used for various purposes by the controller 331, one of them being for storing data and program instructions for various software in the mobile terminal. The software includes a real-time operation system 336, drivers for a man-machine interface (MMI) 339, an application handler 338 as well as various applications. The applications can include a messaging application 340, an alarm application 341, as well as various other applications 342, such as applications for voice calling, video calling, web browsing, media player, document reading and/or document editing, an instant messaging application, a phone book application, a calendar application, a control panel application, one or more video games, a notepad application, etc.

The MMI 339 also includes one or more hardware controllers, which together with the MMI drivers cooperate with the display 323/223, keypad 324/224, as well as various other I/O devices 329 such as microphone, speaker, vibrator, ringtone generator, LED indicator, etc. As is commonly known, the user may operate the mobile terminal through the man-machine interface thus formed.

The software also includes various modules, protocol stacks, drivers, etc., which are commonly designated as 337 and which provide communication services (such as transport, network and connectivity) for an RF interface 333, and optionally a Bluetooth interface 334 and/or an IrDA interface 335 for local connectivity. Optionally, a camera 345 is provided. The RF interface 333 comprises an internal or external antenna as well as appropriate radio circuitry for establishing and maintaining a wireless link to a base station (e.g., the link 102 and base station 104 in FIG. 1). As is well known to a person skilled in the art, the radio circuitry comprises a series of analogue and digital electronic components, together forming a radio receiver and transmitter. These components include, i.e., band pass filters, amplifiers, mixers, local oscillators, low pass filters, AD/DA converters, etc.

The mobile terminal also has a SIM card 330 and an associated reader. As is commonly known, the SIM card 330 comprises a processor as well as local work and data memory.

Now follows a scenario presenting a user interface according to an embodiment of the present invention.

FIGS. 4a-d illustrate schematic screen views of a user interface that can be embodied in the mobile terminal of FIG. 2.

Figure 4A:
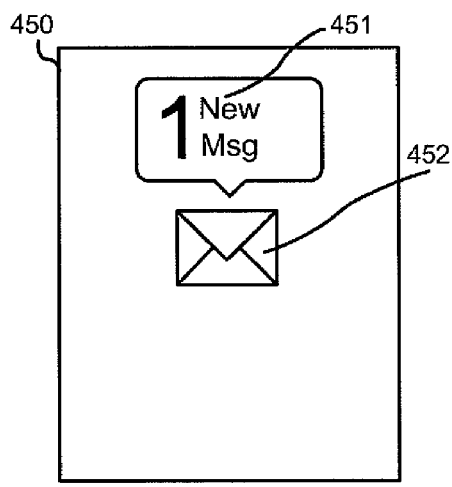
FIGS. 4a-d illustrate schematic screen views of a user interface that can be embodied in the mobile terminal of FIG. 2.

In FIG. 4a, an alert is presented, comprising an icon 452 and a text alert 451 on a screen 450. In this example, a message has been received, whereby the icon 452 is depicted as an envelope. As is known per se, the icon 452 is related to the alert in question. For example, if the alert is an alarm, the icon 452 could be depicted as a clock, or if the alert is a reminder for an appointment, the icon 452 could be depicted as a calendar icon or a graphic associated with the appointment. The icon 452 can be a static icon or it could also be an animation, where the icon is animated at least part of the time. The text alert 451 is related to the alert in question. Optionally, no text alert 451 is presented.

Figure 4B:
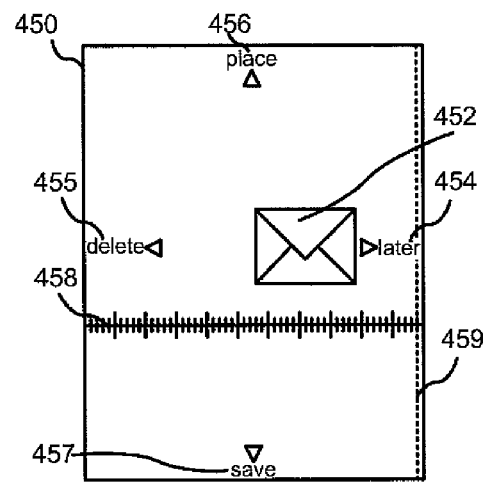

In FIG. 4b, the user has selected the icon 452 and drags it to the right. Depending on what action the user desires to perform with the alert, the user could drag the icon 452 in different directions. For example, if the user drags the icon 452 to the left end of the screen to a delete action 455, the alert is deleted. If the user drags the icon 452 to the top of the screen 450 to a place action 456, the alert can be associated with a place. This can for example be performed by querying the user what place to associate the alert with or using an internal Global Positioning System (GPS) receiver. If the user drags the icon 452 to the bottom of the screen 450 to a save action 457, the alert is saved. In the example illustrated in FIG. 4b however, the user drags the icon 452 to the right towards a later action 454. In this embodiment, the labels 454, 455, 456, 457 are only shown on the display once the user presses the icon 452.

Optionally, a highlight 459 is shown to indicate what action the user is approaching. The highlight can be any suitable visual indication, e.g. a solid line, a pulsating line, an animation on that side of the screen, etc. A timeline 458 can be displayed for indication at what later time the alert will be deferred to reappear.

The user then flicks the icon 452 to the right, to defer the alert. Depending on the momentum of the movement of the icon 452, which depends on the movement of the user input on the touch-sensitive display, such as a finger or a stylus, the alert is deferred sooner or later. The momentum can for example be determined by the speed of the movement of the icon 452. In other words if the user pushes the icon 452 slowly to the right, the alert is deferred to a time soon in the future, e.g. in 15 minutes. On the other hand if the user flicks the icon 452 to the right very quickly, the alert is deferred to a much later time, e.g. in two days. There are many other deferral times that can be determined between the 15 minutes and two days, corresponding to a speed of the icon 452 between the speed for 15 minutes and the speed for 2 days. Optionally, the various times that are available could be user-configurable. The speed can be calculated as an average speed of the whole movement, or the speed at the end of the movement. Calculating the speed only on the end of the movement gives a greater effect of flicking the icon.

Once the user flicks the icon 452 to the right, the timeline 458 can move accordingly, and optionally labels (not shown) are displayed adjacent to the timeline 458, showing an animated sequence of when the alert will be deferred to reappear. Optionally, as a playful bounce effect, if the icon 452 is flicked to the right with too much speed, it bounces back and the alert is not deferred. The user can then try again to move the icon 452 to the right with less speed. If the determined deferral time for an appointment reminder is after the start time of the associated appointment, the playful bounce effect can be shown, or the deferral time can be redetermined to be the start time of the associated appointment.

Figure 4C:
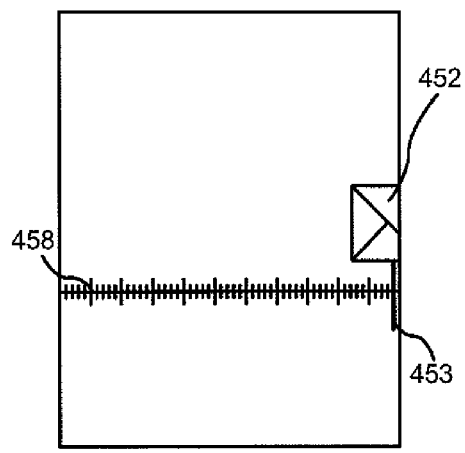

In FIG. 4c, it is shown how the icon 452 has settled at a place in time 453 in relation to the timeline 458.

Figure 4D:
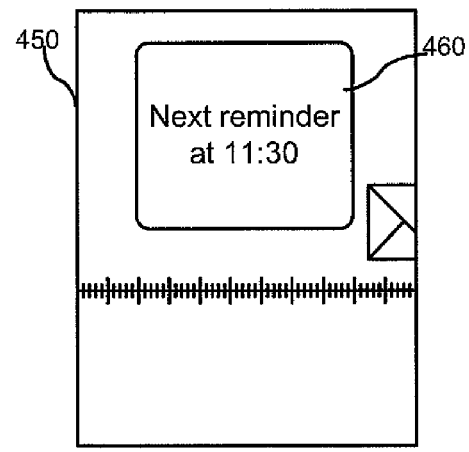

Optionally, as shown in FIG. 4d, a text 460 is shown on the display indicating when the alert is deferred to. Alternatively or additionally, a voice synthesizer can generate an audio message indicating when the alert is deferred to.

Figure 5A:
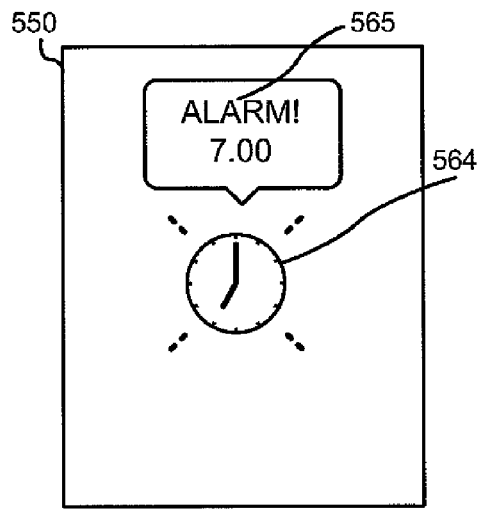
FIGS. 5a-c illustrate schematic screen views of a user interface that can be embodied in the mobile terminal of FIG. 2.
Figure 5B:
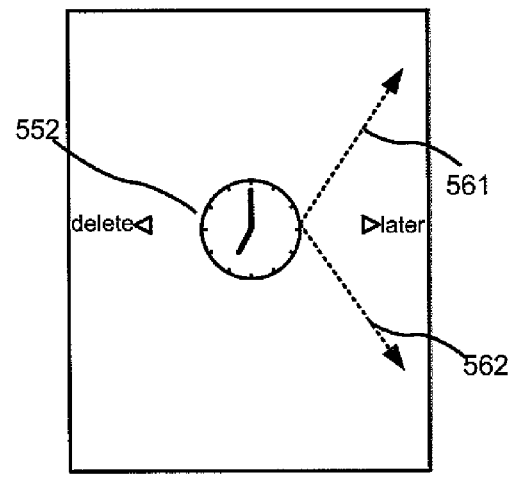

FIGS. 5a-b illustrate schematic screen views of a user interface that can be embodied in the mobile terminal of FIG. 2.

In FIG. 5a an alert is presented in much the same way as described in conjunction with FIG. 4a above. The alert comprises an icon 564 and a text alert 565 on a screen 550. In this example, an alarm clock has been set off, whereby the icon 565 is depicted as a clock. The icon 565 can be a static icon or it could also be an animation, where the icon is animated at least part of the time. The text alert 565 is related to the alert in question. Optionally, no text alert 565 is presented.

As illustrated in FIG. 5b, in this embodiment, the angle at which the icon 565 is moved to the right affects at what time the alert will be deferred to. If the icon 565 is moved to the right end of the screen at a sharp angle upwards, as indicated by an arrow 561, the alert can be deferred to a time soon in the future, e.g. in 15 minutes. On the other hand if the icon 565 is moved to the right end of the screen at a sharp angle downwards, as indicated by an arrow 562, the alert is deferred to a much later time, e.g. in two days. Other angles in between the two angles 561, 562 shown in FIG. 5b would result in times between the times that would be determined for the two shown angles 561, 562. For example, a movement of the icon 565 straight to the right could result in the alert being deferred an hour. Optionally, angle as well as speed are considered when the deferral time is calculated.

Figure 5C:
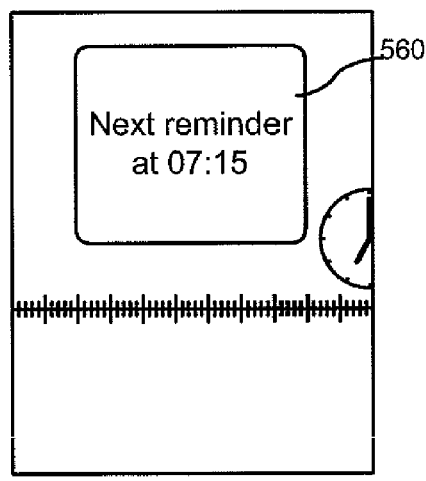

After the time of deferral is determined, the user can optionally be informed as shown in FIG. 5c. A text 560 is shown on the display indicating when the alert is deferred to. Alternatively or additionally, a voice synthesizer can generate an audio message indicating when the alert is deferred to.

It is to be noted that while it is described above to move the icon to the right to defer an alert, it is equally possible to have a device where use any suitable direction is used to defer an alert.

Figure 6:
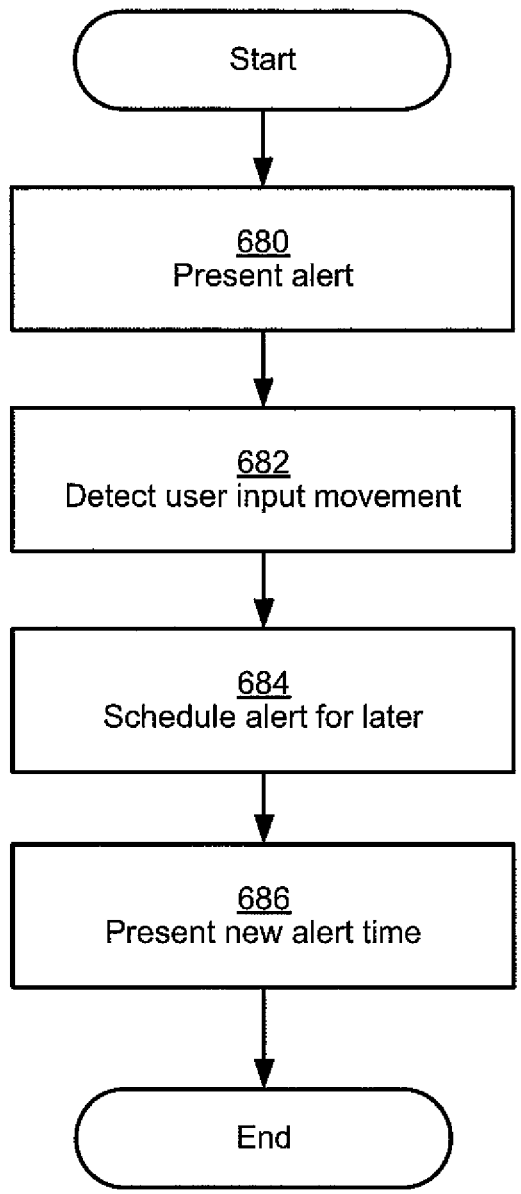
FIG. 6 is a flow chart illustrating a method according to an embodiment of the present invention that can be executed in the mobile terminal of FIG. 2.

FIG. 6 is a flow chart illustrating a method according to an embodiment of the present invention that can be executed in the mobile terminal of FIG. 2. This method corresponds to the scenario disclosed above in conjunction with FIG. 4a-d.

In a present alert step 680, an alert is presented, such as an alert for a new message, an alarm, a reminder for an appointment, a low battery warning etc.

In a detect user input movement step 682, a movement of the user input is detected, where the user input is associated with the alert. For example, when the user input uses a touch-sensitive display this user input can be the user pressing on the icon for the alert and moving the icon to the right. The user can either use a finger or a stylus. Optionally, e.g. in a desktop computer system, a mouse or a trackball could be used to drag the icon to the right. The speed and/or direction of the user input can thus be detected.

In a defer alert 684, the alert is deferred to reappear at a later time. The deferral time is calculated depending on the movement of the user input, e.g. using the speed of the movement of the user input when the icon is moved to the right or the angle at which the icon is moved to the right.

In a present new alert time step 686, the new alert is presented to the user. For example a text of the deferral time is shown on the display or a voice synthesizer reads the deferral time. The deferral time can be presented as a relative time, e.g. the alert is deferred 1 hour, or as an absolute time, e.g. the alert is deferred to 10:37. Optionally, date information can be added.

The whole process can be repeated several times for any message, alarm, etc., whenever an alert is presented.

FIGS. 7a-d illustrate schematic screen views of a user interface that can be embodied in the mobile terminal of FIG. 2.

Figure 7A:
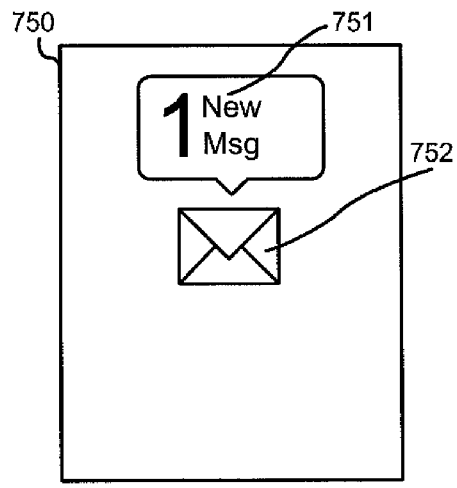
FIGS. 7a-d illustrate schematic screen views of a user interface that can be embodied in the mobile terminal of FIG. 2.

In FIG. 7a, an alert is presented, comprising an icon 752 and a text alert 751 on a screen 750. In this example, a message has been received, whereby the icon 752 is depicted as an envelope. The text alert 751 is related to the alert in question. Optionally, no text alert 751 is presented.

Figure 7B:
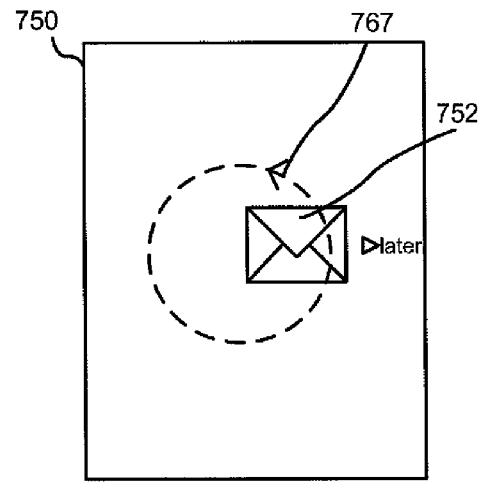

In FIG. 7b, the user has selected the icon 752 and moves it in an orbital motion 767 to charge the alert with more energy, or momentum, by moving the icon 752 around and around, like when winding up a spring. The motion does not need to be circular, any rotational motion is sufficient.

Figure 7C:
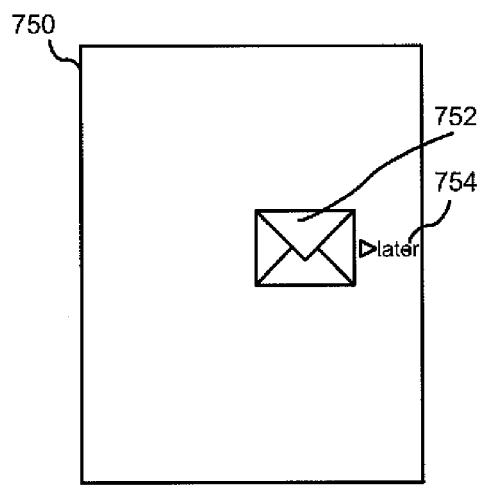

In FIG. 7c, The user then flicks the icon 752 to the right towards a later action 754, to defer the alert. Depending on the momentum of the movement of the icon 752, which depends on the movement of the user input on the touch-sensitive display, the alert is deferred sooner or later. The momentum in this embodiment comprises the momentum built up during the orbital motion described above, and optionally the speed of the final movement of the icon 752. If the momentum is relatively low, the alert is deferred to a time soon in the future, e.g. in 15 minutes. On the other hand if the momentum is relatively high, the alert is deferred to a much later time, e.g. in two days. There are many other deferral times that can be determined between the 15 minutes and two days, corresponding to a momentum of the icon 752 between the momentum for 15 minutes and the momentum for 2 days.

Figure 7D:
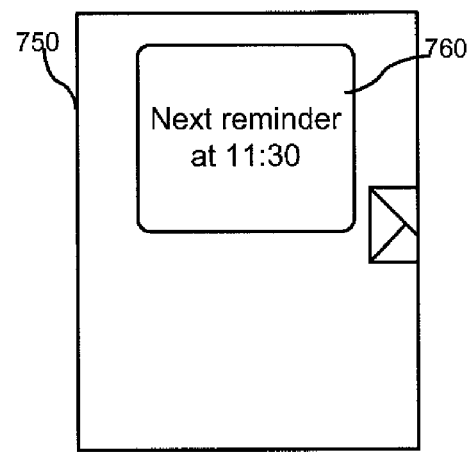

Optionally, as shown in FIG. 7d, a text 760 is shown on the display indicating when the alert is deferred to. Alternatively or additionally, a voice synthesizer can generate an audio message indicating when the alert is deferred to.

Although the invention has above been described using an embodiment in a mobile terminal, the invention is applicable to any type of portable apparatus capable of presenting alerts, including pocket computers, portable mp3-players, portable gaming devices, cameras, lap-top computers, desktop computers etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method comprising:
   providing an alert for a touch-sensitive display;
   detecting a user input on the display in a position associated with said alert,
   detecting a movement of the user input and the end of the user input; and
   deferring said alert to be presented again at a new alert time, said new alert time being calculated as a time in the future using said user input movement.

2. The method according to claim 1, wherein
   said providing an alert involves providing a graphical representation of said alert for displaying on a display; and
   said detecting the movement of the user input involves detecting a direction of said user input and moving said graphical representation on said display in accordance with said movement of said user input.

3. The method according to claim 1, further comprising after said detecting a user input: presenting an animation on said display, said animation indicating a movement of said alert in time from a present time to said new alert in time.

4. The method according to claim 1, further comprising after said detecting a user input: presenting said new alert in time on said display or using speech synthesis.

5. The method according to claim 1, wherein said detecting involves detecting a direction of said user input and said deferring only occurs if said direction, with a margin of error, is associated with deferring said alert.

6. The method according to claim 5, wherein when said direction, within a margin of error, is associated with deleting said alert, said alert is deleted.

7. The method according to claim 5, wherein when said direction, within a margin of error, is associated with saving said alert, said alert is saved.

8. The method according to claim 5, wherein when said direction, within a margin of error, is associated with coupling said alert to a place, said alert is coupled to a place.

9. The method according to claim 1, wherein said detecting a user input involves determining said movement by calculating an average speed of said user input.

10. The method according to claim 1, wherein said detecting a user input involves determining said movement by calculating an average speed of an end portion of said user input.

11. The method according to claim 1, wherein said detecting a user input involves detecting an orbital motion associated with said alert.

12. The method according to claim 1, wherein detecting a user input involves detecting a depression in a position corresponding to said alert; detecting a movement on said touch-sensitive display and detecting a lift from said touch-sensitive display.

13. The method according to claim 1, wherein said alert is an alert selected from the group consisting of a message alert, an alarm, a calendar reminder and an alert for low battery.

14. The method according to claim 1, wherein said method is performed in a mobile communication apparatus.

15. An apparatus comprising:
   a display; and
   a controller,
   wherein said controller is arranged to present an alert on a touch-sensitive display;
   said controller is further arranged to detect a user input on the display in a position associated with said alert, detect the movement of the user input and the end of the user input; and
   said controller is further arranged to, as a result of detecting said user input, defer said alert to be presented again at a new alert in time, said new alert time being calculated as a time in the future using said user input movement.

16. The apparatus according to claim 15, wherein said apparatus is comprised in a mobile communication apparatus.

17. The apparatus according to claim 15, wherein said display is a touch-sensitive display, and said controller is configured to detect said user input using said touch-sensitive display.

18. An apparatus comprising:
   means for providing an alert for a touch-sensitive display;
   means for detecting a user input on the display in a position associated with said alert,
   means for detecting the movement of the and the end of the user input; and
   means for deferring said alert to be presented again at a new alert time, said new alert time being calculated as a time in the future using said user input movement.

19. The apparatus according to claim 18, wherein said apparatus is comprised in a mobile communication apparatus.

20. A non-transitory computer program product comprising software instructions stored on a computer readable medium that, when executed in a controller of a mobile communication apparatus, performs a process comprising:

providing an alert for a touch-sensitive display;

detecting a user input on the display in a position associated with said alert, detecting the movement of the user input and the end of the user input; and deferring said alert to be presented again at a new alert time, said new alert time being calculated as a time in the future using said user input movement.

21. A user interface comprising:

a display;

wherein said user interface is arranged to present an alert on a touch-sensitive display;

said user interface is further arranged to detect a user input on the display in a position associated with said alert, detecting the movement of the user input and the end of the user input; and said user interface is further arranged to, as a result of detecting said user input, defer said alert to be presented again at a new alert in time, said new alert time being calculated as a time in the future using said user input movement.

\* \* \* \* \*